United States Patent
Hillhouse et al.

(10) Patent No.: US 7,274,807 B2
(45) Date of Patent: Sep. 25, 2007

(54) METHOD AND APPARATUS FOR SUPPORTING A BIOMETRIC REGISTRATION PERFORMED ON A CARD

(75) Inventors: Robert D. Hillhouse, Ottawa (CA); Laurence Hamid, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 735 days.

(21) Appl. No.: 10/157,120

(22) Filed: May 30, 2002

(65) Prior Publication Data
US 2003/0223625 A1 Dec. 4, 2003

(51) Int. Cl.
*G06K 9/00* (2006.01)
*H04K 1/00* (2006.01)

(52) U.S. Cl. .............. 382/124; 382/115; 713/186; 902/3; 340/5.52

(58) Field of Classification Search ........ 382/115–127; 713/186; 356/71; 902/3; 340/5.1, 5.2, 5.52, 340/5.53
See application file for complete search history.

(56) References Cited

U.S. PATENT DOCUMENTS

| | | | |
|---|---|---|---|
| 5,509,083 A * | 4/1996 | Abtahi et al. ............. | 382/124 |
| 5,513,272 A | 4/1996 | Bogosian, Jr. | |
| 5,920,640 A | 7/1999 | Salatino et al. | |
| 6,011,858 A | 1/2000 | Stock et al. | |
| 6,016,476 A | 1/2000 | Maes et al. | |
| 6,049,621 A * | 4/2000 | Jain et al. ................ | 382/125 |
| 6,185,318 B1 * | 2/2001 | Jain et al. ................ | 382/125 |
| 6,219,439 B1 | 4/2001 | Burger | |
| 6,241,288 B1 | 6/2001 | Bergenek et al. | |
| 6,282,302 B1 | 8/2001 | Hara | |
| 6,289,112 B1 * | 9/2001 | Jain et al. ................ | 382/116 |
| 6,311,272 B1 | 10/2001 | Gressel | |
| 6,487,306 B1 * | 11/2002 | Jain et al. ................ | 382/125 |
| 6,719,200 B1 * | 4/2004 | Wiebe ...................... | 235/382 |

(Continued)

FOREIGN PATENT DOCUMENTS

EP 0 680 004 A1 11/1995

(Continued)

OTHER PUBLICATIONS

Davida et al., "On Enabling Secure Applications Through Off-line Biometric Identification", XP-00082537, pp. 148-156, IEEE 1998.

*Primary Examiner*—Vikkram Bali
*Assistant Examiner*—Aaron W Carter
(74) *Attorney, Agent, or Firm*—Woodcock Washburn LLP

(57) ABSTRACT

A method for matching biometric data on a smart card is disclosed. A smart card is provided having biometric template data stored thereon. A host processor in communication with the smart card is also provided. A sensed biometric image is provided to the host processor from an individual. From the smart card to the host processor, co-ordinate data relating to a plurality of non-contiguous features of the template data are provided. Other data is extracted from the biometric image, the other data for correlation with the provided co-ordinate data allowing for a subsequent alignment of the biometric image within a known frame of reference relative to the template data on the basis of the provided data and the other data. Once aligned, biometric data is extracted from the biometric image, the biometric data within the known frame of reference and then the extracted biometric data is transmitted to the smartcard.

79 Claims, 13 Drawing Sheets

U.S. PATENT DOCUMENTS

| | | |
|---|---|---|
| 2002/0030359 A1 | 3/2002 | Bergenek et al. |
| 2002/0050713 A1 | 5/2002 | Bergenek et al. |
| 2003/0169910 A1* | 9/2003 | Reisman et al. ............ 382/124 |
| 2004/0052405 A1* | 3/2004 | Walfridsson ................ 382/115 |
| 2004/0175023 A1* | 9/2004 | Svedin et al. ............... 382/124 |
| 2004/0215615 A1* | 10/2004 | Larsson et al. ................ 707/9 |

FOREIGN PATENT DOCUMENTS

| | | |
|---|---|---|
| EP | 1 385 118 A2 | 1/2004 |
| WO | WO99/51138 A2 | 10/1999 |
| WO | WO 00/51244 A1 | 8/2000 |
| WO | WO 00/65478 A1 | 11/2000 |
| WO | WO 01/11577 A1 | 2/2001 |
| WO | WO 01/84478 A1 | 11/2001 |
| WO | WO 01/84494 A1 | 11/2001 |
| WO | WO 01/90962 A1 | 11/2001 |
| WO | WO 01/99042 A1 | 12/2001 |
| WO | WO 03/003286 A1 | 1/2003 |

* cited by examiner

| Feature | X-loc | Y-loc | Orientation | Type |
|---|---|---|---|---|
| Core | 0 | 0 | 0 | whirl |
| Minutia | 4 | 4 | 34 | 2 |
| Minutia | -4 | -1 | 306 | 1 |
| Minutia | 1 | -4 | 270 | 1 |
| Minutia | 12 | -1 | 165 | 2 |
| Minutia | -14 | 4 | 12 | 2 |
| Minutia | 34 | -40 | 287 | 1 |
| Minutia | 6 | 32 | 73 | 2 |
| Minutia | -3 | -44 | 102 | 2 |
| Minutia | 18 | -22 | 56 | 1 |
| Minutia | 12 | -1 | 156 | 1 |
| Minutia | -26 | 9 | 43 | 2 |
| Minutia | 22 | -28 | 298 | 1 |

Figure 4

METHOD AND APPARATUS FOR SUPPORTING A BIOMETRIC REGISTRATION PERFORMED ON A CARD

FIELD OF THE INVENTION

The invention relates to a method of identifying an individual by comparing biometric information of the individual with reference data that is carried on a token, and more particularly to a method of identifying an individual in which the comparison is performed on a processor of the token.

BACKGROUND OF THE INVENTION

Magnetic strip cards have been widely used for controlling access by individuals to information, rooms and financial transaction instruments. Typically, the individual must "swipe" the card through a magnetic strip reader and provide a personal identification number (PIN) in order to be identified as an authorized user of the card. This system suffers from several disadvantages, including the tendency of individuals to forget an assigned PIN number, or to seriously compromise the security of an assigned PIN number by writing it down in close proximity to the card. Similarly, individuals have a tendency to select PIN numbers that are easily remembered and that often have a personal significance, such as a birth date, which PIN numbers are easily guessed by an unauthorized individual. Accordingly, magnetic strip cards are convenient, but do not provide a high level of security.

Tokens, such as for instance a smart card having a microprocessor and a memory, are being used increasingly for controlling access to information, buildings and financial transactions. Typically, the smart card has stored within its memory a biometric information sample of the authorized user of the smart card, for instance a fingerprint image. When the authorized user of the smart card desires access to an area or to information, the user provides a biometric information sample in the form of a fingerprint for comparison with the stored fingerprint image, and if a match is determined, the user is identified and access is granted. Unfortunately, the processors that are provided on such smart cards are relatively slow and generally unsuitable for performing the types of floating point calculations that are necessary in order to, for example, rotate and process fingerprint image data.

One approach to reducing the processing requirements of the smart card processor is to do some of the image processing for use in biometric recognition in a first host processor and then to pass the processed data to the smart card for a final stage of recognition. Such an approach is discussed in patent application WO 01/11577 assigned to Precise Biometrics and in patent application WO 01/84494, also assigned to Precise biometrics. In these references, a method is disclosed wherein a processor external to the smart card pre-processes biometric information to extract therefrom a small subset of the biometric information—a portion of an image of a fingerprint—in order to reduce the amount of processing required on the smart card processor.

In patent application WO 01/11577, it is disclosed to transmit this subset of biometric information in the place of the PIN that is commonly used to access information stored on a smart card. In reality, the subset of biometric information becomes the new "PIN" and is merely a larger PIN that is more difficult to guess. That said, once the PIN is guessed successfully, security of the smart card is compromised and the device and method are rendered useless.

Also, the use of a subset of, for example, a fingerprint image as a PIN is difficult. Fingerprints and other biometric information sources are not truly repeatable in nature. A fingertip may be dryer or wetter. It may be more elastic or less. It may be scratched or dirty or clean. Each of the above listed conditions affects the fingerprint image and, as such, means that the image subset may very well differ. Typical PIN analysis requires provision of the unique and static PIN. Here, such a method will result in a system that is very inconvenient to use.

In patent application WO 01/84494, it is disclosed to transmit to the first host processor a portion of the stored biometric information sample for use in alignment and subset extraction. Then, when the subset is provided to the smart card, it is already pre-processed and only a small portion of the original data sensed from the biometric information sample of the authorized user requires processing. The reduced amount of data for processing by the smart card processor results in a reduced processing time and, as such, enhances performance. Unfortunately, once the subset is guessed successfully or intercepted, security of the smart card is compromised and the device and method are rendered useless.

Furthermore, although there is little correlation between an individual and the fingerprints they are born with, there is within a single fingerprint a significant amount of correlation. The same is true of irises, retina, faces, and so forth. Taking a face as an easily illustrated example, it is easy to verify that most people fall within a norm of values for certain facial features given other facial features. For example, given a placement of one eye, the other eye is usually within an easily estimated range of locations, orientations and colors. The same is true for fingerprints, in that once you have a fingerprint image that is missing a small rectangular area, the randomness of what is in the missing area is changed from the randomness of fingerprint assignment to a much lesser randomness allowing for guessing of features therein with more likelihood of success. As such, security is greatly compromised by the method described supra.

Another drawback to the prior art method is that it makes public a large portion of the biometric data and, as such, renders updates or improvements to user identification processes limited to operation on those private areas of the biometric data. This too is a significant drawback.

It is an object to provide a method of identifying an individual that overcomes the limitations of the prior art.

SUMMARY OF THE INVENTION

In accordance with an aspect of the invention there is provided a method for matching biometric data on a smart card including the steps of:

providing a smart card having biometric template data stored thereon;

providing a host processor in communication with the smart card;

providing a sensed biometric image to the host processor;

providing co-ordinate data relating to a plurality of non-contiguous features of the template data from the smart card to the host processor;

extracting other data from the biometric image, the other data for correlation with the provided co-ordinate data;

aligning the biometric image within a known frame of reference relative to the template data on the basis of the provided data and the other data;

extracting biometric data from the biometric image, the biometric data within a known frame of reference; and providing the biometric data to the smartcard.

In accordance with another aspect of the invention there is provided a biometric identification system comprising:

a first memory;

a first transceiver;

a biometric sensor for sensing an image of a biometric information source, and for providing sensed biometric image data to the first processor;

a first processor in operative communication with the first transceiver, the first processor for executing the steps of:

receiving sensed biometric image data from the biometric sensor, receiving alignment data including co-ordinates from the first transceiver, the alignment data for use by the processor in aligning the sensed biometric image data within a known frame of reference, aligning the sensed biometric image data within the known frame of reference, determining from the aligned biometric image data extracted biometric data, and providing the extracted biometric data based on the aligned biometric image data and within the known frame of reference to the first transceiver;

a second memory for storing biometric template data;

a second transceiver in communication with the first transceiver for transmitting data thereto and for receiving data therefrom; and, a second processor in operative communication with the second transceiver, the second processor for performing the steps of:

providing alignment data including co-ordinates to the second transceiver for transmission to the first transceiver, the alignment data for use by the first processor in aligning sensed biometric data within a known frame of reference, receiving the extracted biometric data aligned within the known frame of reference, and correlating the received biometric data with template data stored within the second memory.

In accordance with another aspect of the invention there is provided a smartcard for performing biometric identification thereon comprising:

a transceiver for transmitting data from the smartcard and for receiving data provided to the smartcard;

a processor; and, a memory for storing template data relating to a biometric image and for storing data relating to instructions for execution by the processor, the instructions comprising instructions for performing the steps of:

providing alignment data including co-ordinates to the transceiver for transmission from the smartcard, the alignment data for use by another processor in aligning sensed biometric data within a known frame of reference, receiving biometric data aligned within the known frame of reference, the biometric data received from other than within the smartcard, correlating the received biometric data with template data stored within the memory, the correlating performed within the smartcard; and performing one of identifying and authorizing an individual in dependence upon the step of correlating.

In accordance with another aspect of the invention there is provided a method for registering biometric data with a template on a smart card including the steps of:

providing alignment data including co-ordinates for transmission from the smartcard, the alignment data for use by another processor in aligning sensed biometric data within a known frame of reference, receiving biometric data aligned within the known frame of reference, the biometric data received from other than within the smartcard, and correlating the received biometric data with template data stored within the smartcard, the correlating performed within the smartcard to produce a correlation result.

In accordance with another aspect of the invention there is provided a biometric imaging station for use with a portable electronic device in performing biometric identification on the portable electronic device comprising:

a biometric sensor for sensing an image of a biometric information source to provide sensed biometric image data;

a transceiver for transmitting data to the portable electronic device and for receiving data provided from the portable electronic device;

a memory for storing data; and, a processor for performing the steps of:

receiving alignment data including co-ordinates from the transceiver from the portable electronic device, the alignment data for use by the processor in aligning the sensed biometric data within a known frame of reference, aligning the sensed biometric image data within the known frame of reference, determining from the aligned biometric image data extracted biometric data, and providing the extracted biometric data based on the aligned biometric image data and within the known frame of reference the portable electronic device.

In accordance with another aspect of the invention there is provided a storage medium having data stored therein and relating to instructions for performing the steps of:

receiving alignment data including co-ordinates from the transceiver from the portable electronic device, the alignment data for use by the processor in aligning the sensed biometric data within a known frame of reference, aligning the sensed biometric image data within the known frame of reference, determining from the aligned biometric image data extracted biometric data, and providing the extracted biometric data based on the aligned biometric image data and within the known frame of reference the portable electronic device.

In accordance with another aspect of the invention there is provided a method for registering biometric data on a smart card including the steps of:

sensing a biometric source to provide biometric data;

receiving alignment data including co-ordinates from the smartcard, the alignment data for use in aligning sensed biometric data within a known frame of reference, aligning the sensed biometric image data within the known frame of reference, determining from the aligned biometric image data biometric data, and providing the biometric data based on the aligned biometric image data and within the known frame of reference of the smartcard.

BRIEF DESCRIPTION OF THE DRAWINGS

The invention will now be described with reference to the attached drawings in which:

FIG. 4 is a schematic representation of a biometric fingerprint template;

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein. In particular, the invention is described with reference to fingerprints but it is to be completely understood that the invention also works with other forms of biometric information.

Figure 1:
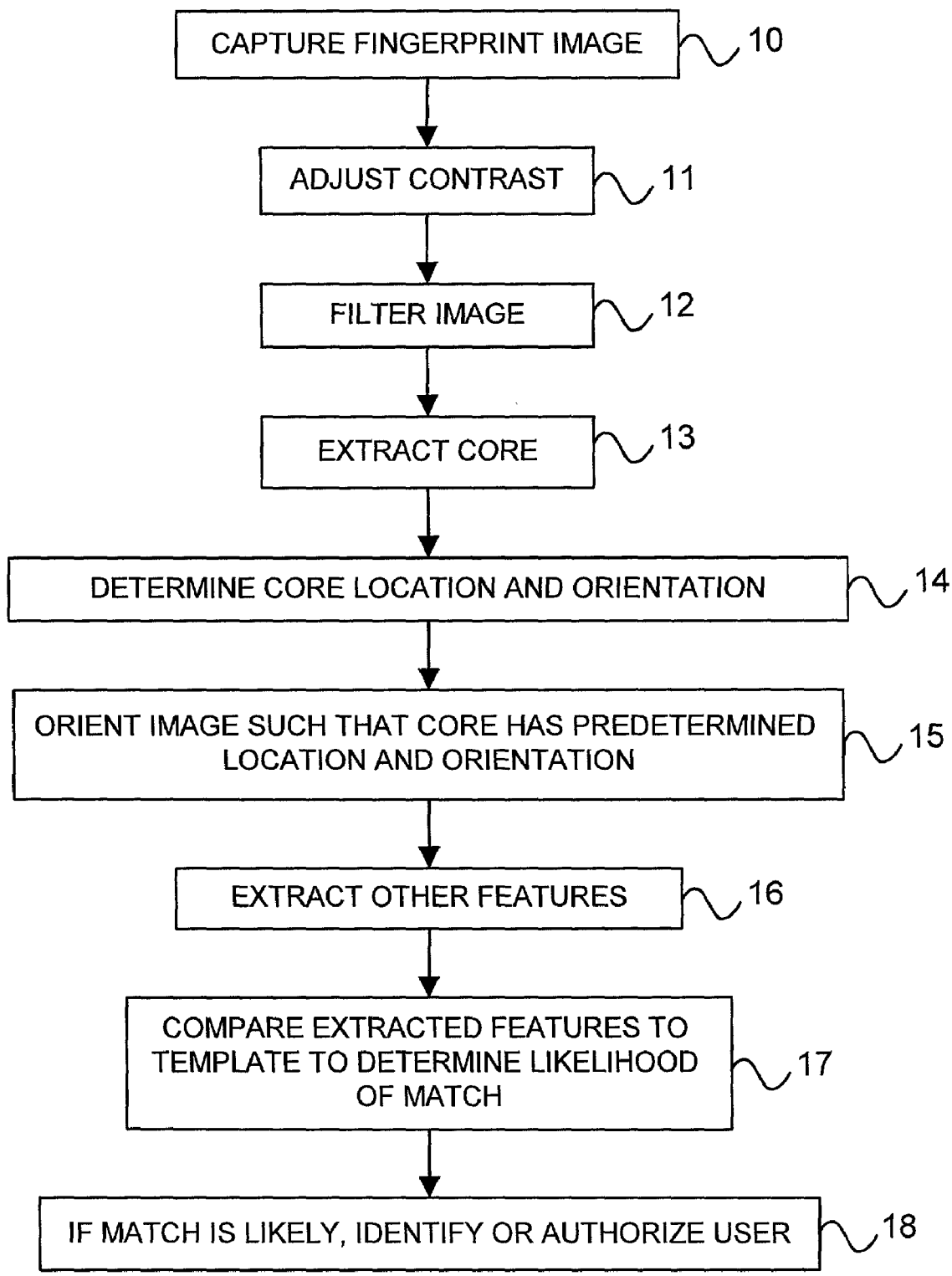
FIG. 1 is a simplified flow diagram of a prior art method of performing fingerprint identification.

Referring to FIG. 1, a prior art method of performing fingerprint identification is shown. A fingerprint is imaged in steps 10. The image is then filtered using image processing filtering techniques in step 12 and the contrast is adjusted to a normalized level in step 11. Once preprocessing of the image is completed, the image is in a standardized form for analysis.

The image is then analyzed in step 13 to determine a core feature or features. This feature is used to align the image in space and orientation in step 14 in order to allow for more accurate correlation with template data. Once oriented in step 15, the image is analyzed and features are identified for use in correlation in step 16. The features are compared to features in a stored template to determine a likelihood of a match in step 17. When a match is likely, a user identification or authorization is performed in step 18.

Though capturing of biometric image data is not an exact process and, as such, variations in the captured image often occur, feature alignment is a very likely cause of registration inaccuracies and variations. Thus, two images that are of an identical biometric information source and that contain identical information offset one from another in translation and rotation may not register exactly one against another. This results from small differences in image alignment even once image orientation has occurred.

Much of the processing that occurs during the analysis of the fingerprint is related to reorienting the fingerprint for easier correlation and to feature identification.

Figure 2:
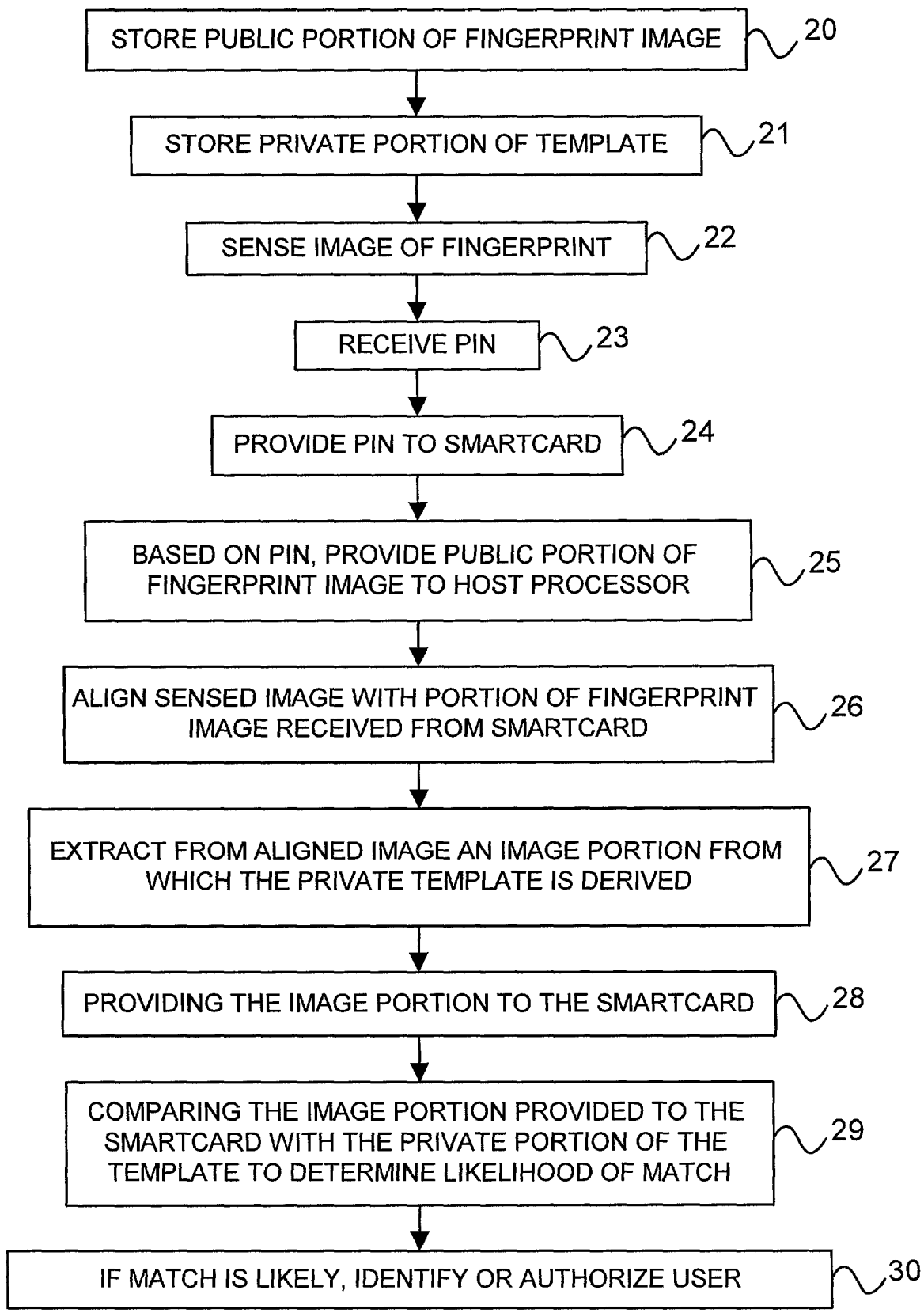
FIG. 2 is a simplified flow diagram of a prior art method of preprocessing a fingerprint image.

Referring now to FIG. 2, shown is a prior art method of preprocessing a fingerprint image wherein biometric data is provided to the preprocessor from the smartcard in the form of a public portion of a template. For example, during a registration step (not shown), an authorized user of the smart card provides a fingertip having a fingerprint to an imaging device that is in communication with the smart card. The imaging device senses the topological features of the fingerprint and stores an image of the fingerprint template in memory of the smart card. The memory includes a public access portion for storing a public portion of the fingerprint image in step 20 and a private access portion for storing a private portion of the fingerprint image in step 21.

When the authorized user of the smart card wishes to be identified or recognized, the same fingertip is provided to an imaging device in step 22 of a host system in communication with the smart card, the fingerprint is imaged and stored electronically in a memory of the host system. The user provides a PIN to the host system in step 23 and the PIN is provided from the host system to the smart card in step 24. In dependence upon the PIN being verified, the smart card provides the public portion of the fingerprint image to a processor of the host system in step 25. The host processor aligns the sensed fingerprint image with the public portion of the fingerprint image that was provided from the smart card in step 26. The host processor then extracts from the aligned image an image portion from which the private template is derived in step 27. The image portion is provided to the smart card in step 28, where the smart card processor compares the image portion with the private portion of the template to determine a likelihood of a match in step 29. If a match is likely, the user is identified or recognized in step 30. If a match is other than likely, then the authorization attempt is rejected and the user is denied access.

Figure 3:
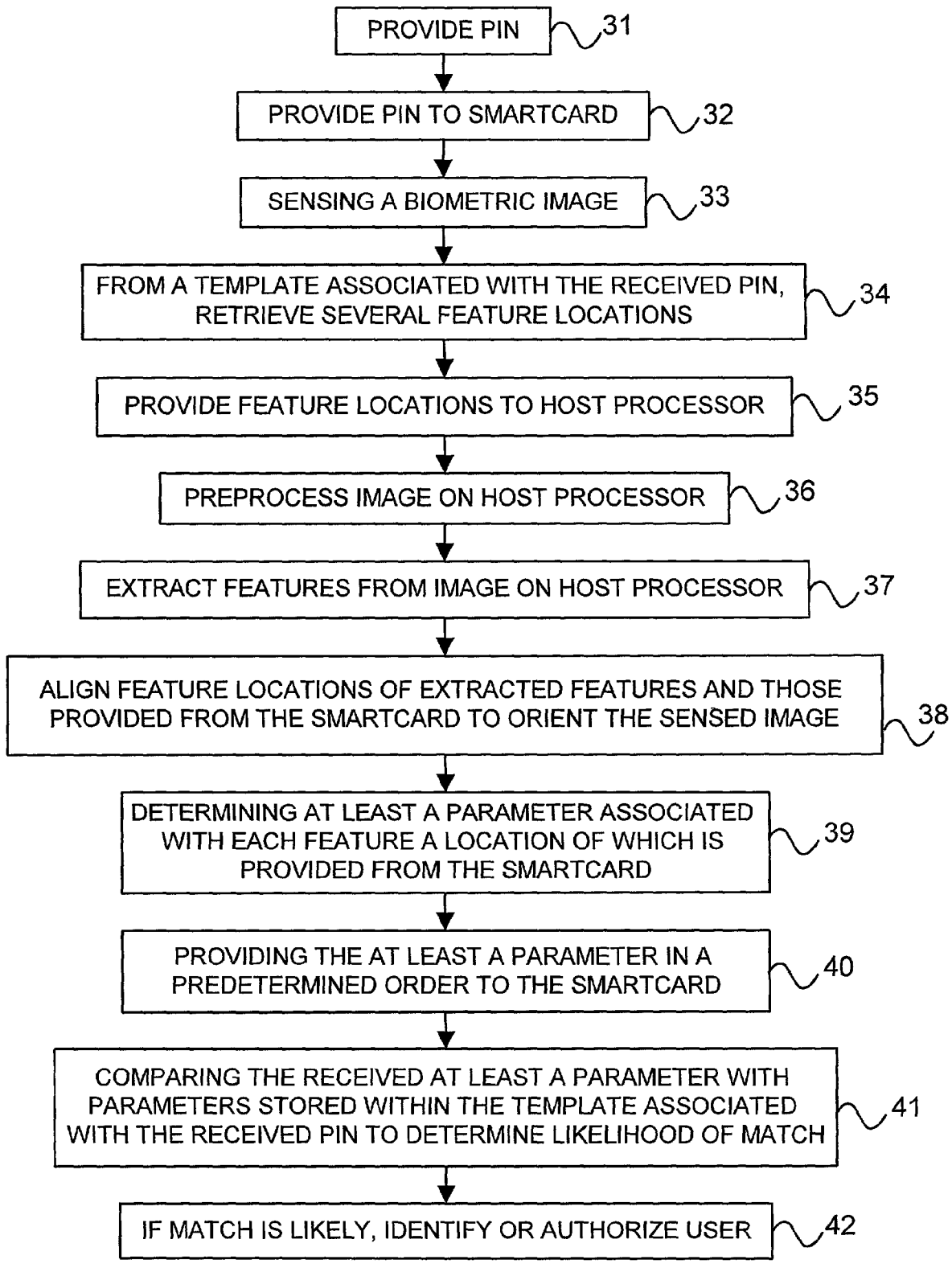
FIG. 3 is a simplified flow diagram of a method of preprocessing a fingerprint image according to another embodiment of the instant invention.

Referring now to FIG. 3, a method of preprocessing a fingerprint image according to the instant invention is shown, wherein biometric data is not provided to a preprocessor, for instance a processor of a host system, from the smart card. As such, the process is alterable without suffering the drawbacks of the prior art methods. Further, as noted above, when fingerprint image data is provided from the smartcard, this reduces the security of the fingerprint registration system since correlation data is determinable from the data received from the smart card.

The user provides in step 31 a PIN to a host computer system in communication with the smart card, and the host computer provides the PIN to the smart card in step 32.

Next, a fingerprint image of the user is captured using an imaging device of the host system in step 33. The image is filtered and the contrast is adjusted to a normalized level. The fingerprint image is then analyzed by the host processor to determine features thereof. Typically features of fingerprints include ridge flow angle, minutia locations, minutia types, minutia directions, core location, core orientation, and so forth. Of course, in order for any of the features to have meaning, they all must be related to a global position; this global position and orientation is often related to the core location and orientation.

Thus, a typical biometric fingerprint template appears as shown in the diagram of FIG. 4. Of course, other data formats and orders are possible. Further, it is possible to store the data in any form that allows extraction of the same information therefrom. For example, each minutia may be stored relative to a previous minutia without changing the information content of the template.

As is evident from FIG. 4, the core is arbitrarily assigned the coordinate (0,0). The core orientation is assumed to be in the Y direction. The minutia are listed in order of distance from the core. About the core the minutia are denser than at a distance therefrom. The template of FIG. 4 has 24 minutia listed. Though this is the case, often fingerprint analysis and recognition systems use far fewer minutia to perform an identification process.

Each minutia has a location expressed as a coordinate, has a direction expressed as an angle or as a slope, and has a type expressed in the template shown by a numeric identifier, each number indicative of a particular predetermined minutia type.

There is also an identifier indicating the fingerprint type, and the ridge flow angle at several locations. Of course other features are also known and could be extracted from a fingerprint image and stored within the template for later identification.

Thus, as noted with reference to FIG. 1, the main processing tasks in biometric registration include, image processing to filter the image and, when necessary, scale and normalize the image; global feature identification; image rotation and translation relative to the global feature; feature extraction from the image; feature analysis and identification; feature correlation with template features. Of course when the template is an image, the step of feature analysis and identification is unnecessary and the step of correlation is more complex or less reliable.

Of the steps outlined above, feature correlation is the least processor intensive while global feature identification, image rotation, and feature extraction are the most processor intensive. That said, these are the processes that are typically performed by the correlating processor since only that processor has available thereto the data necessary for performing such a correlation.

Returning to FIG. 3, the method provides for provision of challenge data relating to a template, the data other than image data of a biometric information source. For instance, in step 34 the smart card retrieves from the smart card memory a stored template that is associated with the received PIN, and retrieves a plurality of feature locations from the template. Of course, the feature locations need not be stored within the template. The plurality of locations is of identifiable features, preferably features having accurately identifiable locations.

A processor of the host system receiving in step 35 the challenge and an image of a biometric information source then uses the challenge data to orient the biometric information source relative thereto in step 36. This is performed by identifying features within the image in step 37, determining feature locations in step 38, and then moving the feature locations to overlap the provided locations in step 39 until a reasonable approximation of image positioning is achieved.

Once the image positioning is achieved, data relating to a plurality of features within the image are provided to the card for correlation in step 40. For example, the data relates to minutia locations and directions of the 12 minutia nearest the first point provided.

Thus the processor of the smart card need only compare a plurality of values to values within the template stored thereon in step 41 in order to form a registration measure for use in user authorization. Preferably, the comparison is not a fixed comparison to allow for missed minutia or extra minutia within a template. If a match is likely, the user is identified or recognized in step 42. If a match is other than likely, then the authorization attempt is rejected and the user is denied access.

Since feature locations are provided from the smartcard for aligning the image, it is possible to provide features at a significant distance one from another. As is known to those of skill in the art of image processing, the longer the distance between two points to be aligned, the more accurate the rotational alignment. Of course a third point is needed to differentiate between 180 degree rotations. Thus, by selecting feature locations at a distance one from another, the alignment accuracy is improved relative to alignment of image data based on a single feature—core—and its orientation.

Figure 5:
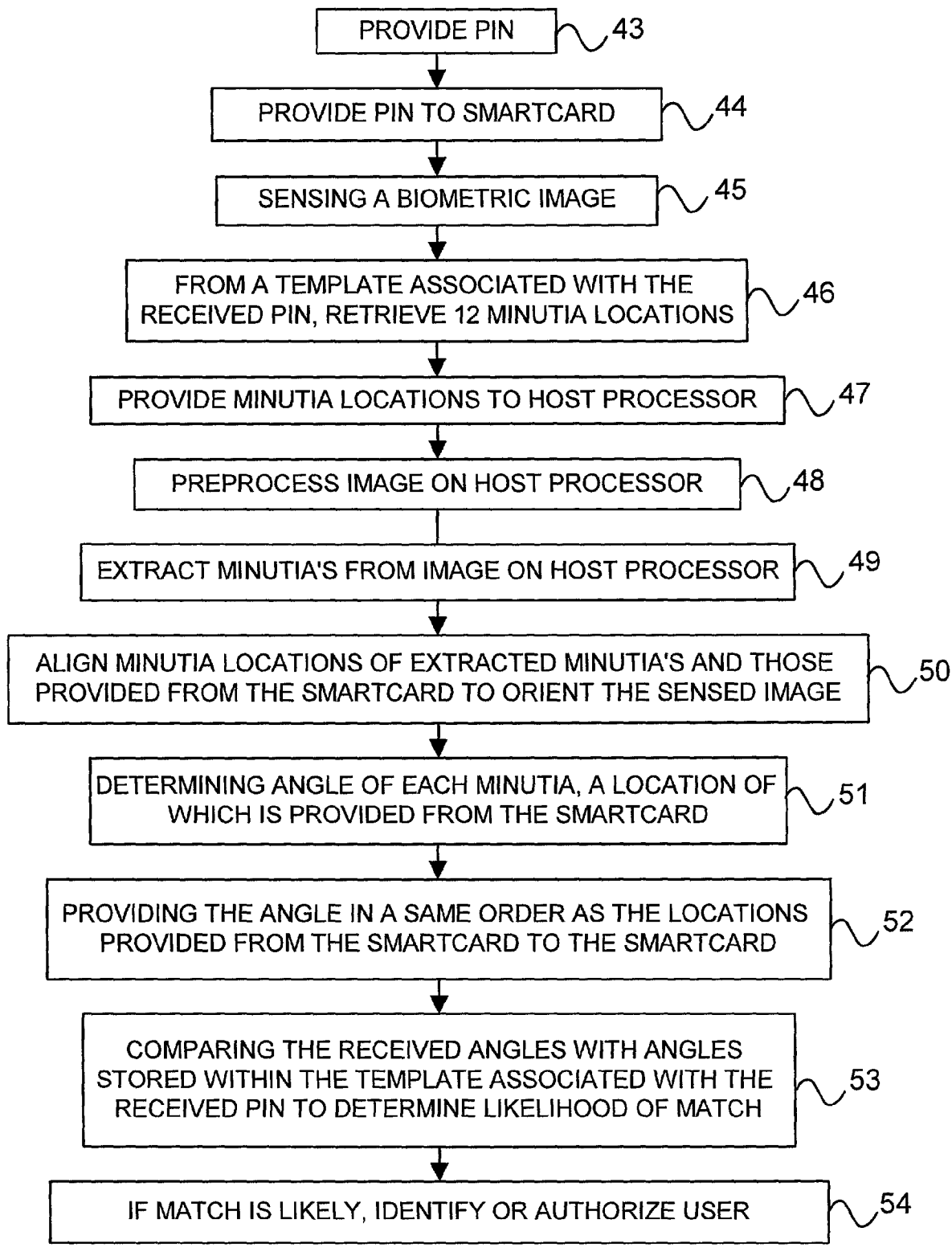
FIG. 5 is a simplified flow diagram of a method of preprocessing a fingerprint image according to another embodiment of the instant invention.

Referring to FIG. 5, a more specific embodiment of the method of FIG. 3 is shown. The user provides in step 43 a PIN to a host computer system in communication with the smart card, and the host computer provides the PIN to the smart card in step 44. Next, a fingerprint image of the user is captured using an imaging device of the host system in step 45. The smart card retrieves 12 minutia locations from a stored template, which template is associated with the provided PIN in step 46. Of course any number of minutia locations are optionally provided. The 12 minutia locations are provided from the smart card to the processor of the host system in step 47. It is evident to those of skill in the art that from a plurality of minutia locations, little or nothing is determinable about the minutia types or directions. Further, little or nothing is determinable about the fingerprint such as type, ridge flow angles, core location—since there are insufficient minutia to accurately identify the denser cluster about the core—and so forth. As such, the minutia locations themselves are insufficient to provide information for statistical estimation of image features.

The captured fingerprint is filtered and the contrast is adjusted to a normalized level in step 48. The image is then analyzed by the host processor to determine features thereof, and minutia locations are extracted in step 49. The captured fingerprint image is then aligned by the host processor with the 12 minutia locations provided from the smart card, in order to spatially and rotationally orient the image in step 50. Once completed, the processed image is located in direct correlation to the template data. Advantageously, such a process obviates a need for core identification, extraction, and orientation.

The processed image is then analyzed by the host processor to extract data relating to each minutia provided in step 51. For each minutia extracted, a minutia direction, for instance an angle, is returned as is a minutia type. The host processor provides the angles and types to the smart card, in a same order as the locations were provided from the smart card to the host processor in step 52. The smart card processor then compares the angle returned for each minutia to an angle stored within the template data and the minutia types to known minutia types stored within the template to determine if a match between the captured fingerprint image and the template data is likely in step 53. If a match is likely, the user is identified or recognized in step 54. If a match is other than likely, then the authorization attempt is rejected and the user is denied access.

Of note, when the angle is provided with 12 degree increments and there are 8 minutia types, only one byte of data is provided to the smartcard for each minutia. Thus, in the above example only 12 bytes are provided thus minimizing data transfer to the smartcard and correlation processing thereby. Also, the minutia direction is correlatable to a grid angle allowing for storage of minutia with only a few bits.

Figure 6:
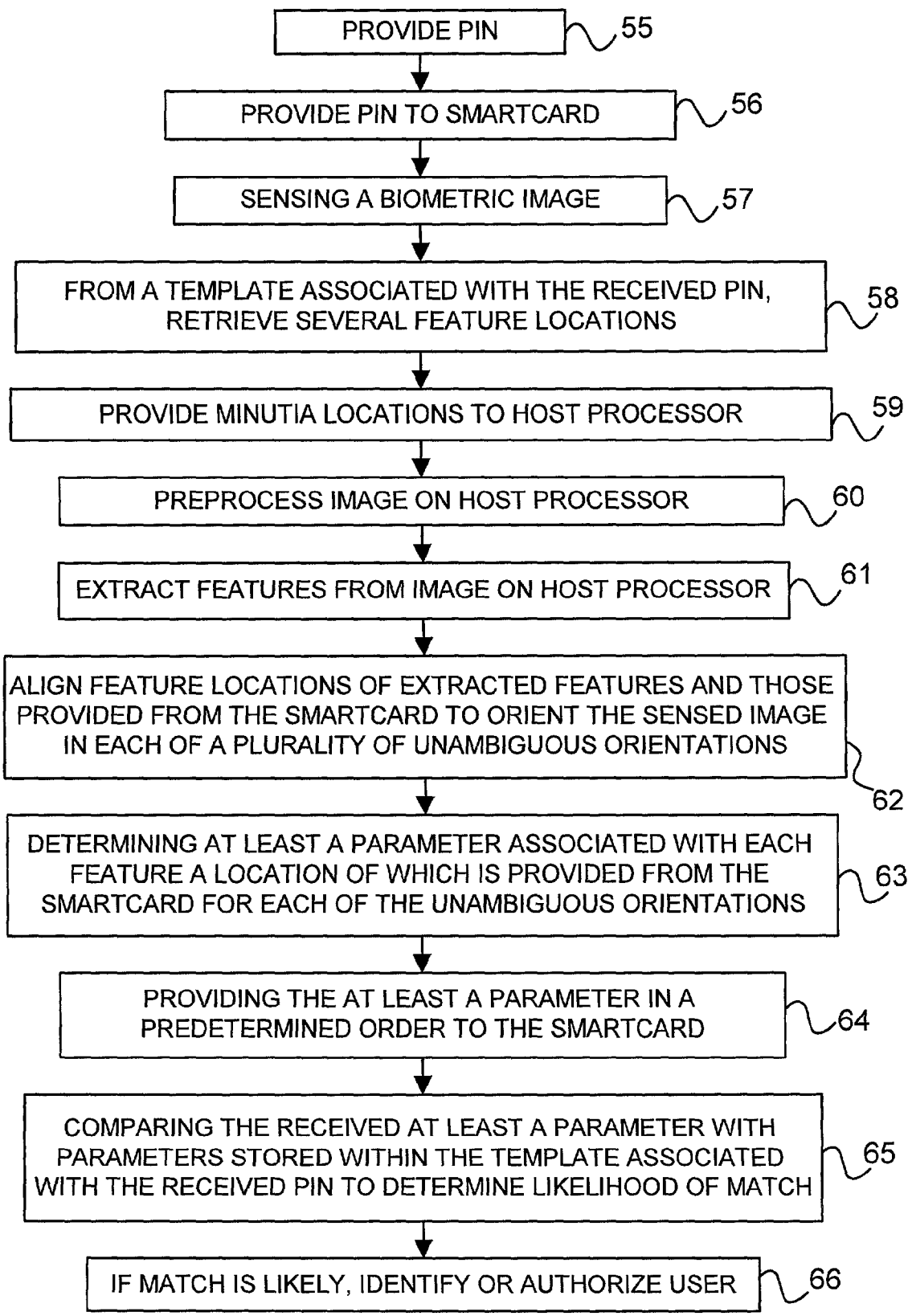
FIG. 6 is a simplified flow diagram of a method of preprocessing a fingerprint image according to another embodiment of the instant invention.

Referring now to FIG. 6 a method of preprocessing a fingerprint image according to the instant invention is shown, wherein biometric data in the form of a public portion of a template is not provided to a preprocessor, for instance a processor of a host system, from the smart card. As such, the process is alterable without suffering the drawbacks of the prior art methods.

The user provides in step 55 a PIN to a host computer system in communication with the smart card, and the host computer provides the PIN to the smart card in step 56. Next, a fingerprint image of the user is captured using an imaging device of the host system in step 57. The image is filtered and the contrast is adjusted to a normalized level. The fingerprint image is then analyzed by the host processor to determine features thereof. Typically features of fingerprints include ridge flow angle, minutia locations, minutia types, minutia directions, core location, core orientation, and so forth. Of course, in order for any of the features to have meaning, they all must be related to a global position; this global position and orientation is often related to the core location and orientation.

The method of FIG. 6 provides for provision of challenge data relating to a template, the data other than image data of a biometric information source. For instance, the smart card retrieves from the smart card memory a stored template that is associated with the received PIN, and retrieves a plurality of feature locations from the template in step 58. The plurality of locations is of identifiable features, preferably features having accurately identifiable locations.

Figure 6A:
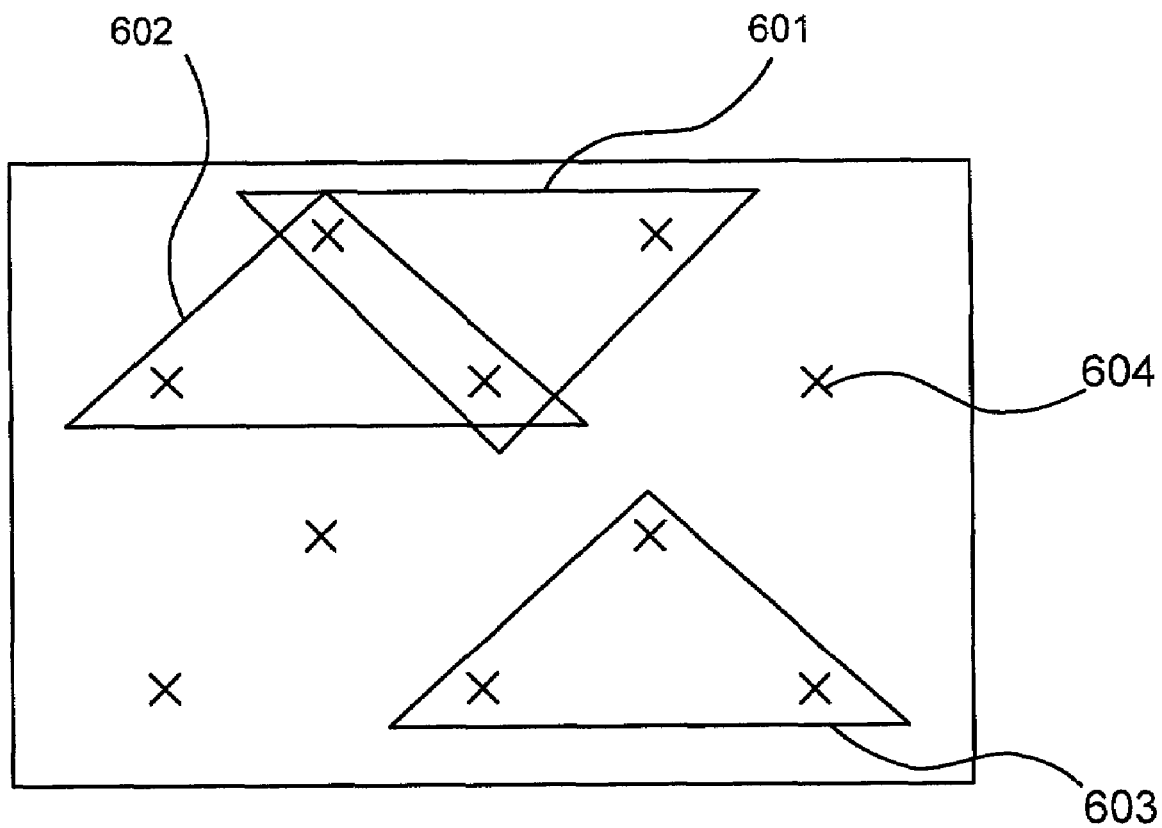
FIG. 6a is an example of three feature locations allowing for three orientations of an image.

A processor of the host system receiving in step 59 the challenge and an image of a biometric information source then uses the challenge data to orient the biometric information source in step 60 relative thereto in each of a plurality of unambiguous orientations. This is performed by identifying features within the image in step 61, determining feature locations in step 62, and then moving the feature locations to overlap the provided locations until a reasonable approximation of image positioning is achieved for each of the unambiguous orientations in step 63. For example, three feature locations 601, 602 and 603 are provided which allows for, in this example, three orientations of the image of FIG. 6*a*. Thus, for each orientation, features 604 are differently positioned one relative to another. There are three unambiguous alignments though it is ambiguous which of the three is actually the intended alignment.

Once the image positioning is achieved, data relating to a plurality of features within the image for each one of the plurality of unambiguous orientations are provided to the smart card in a predetermined order for correlation in step 64. For example, the data relates to minutia locations and directions of the 12 minutia nearest the first point provided. Alternatively, the data may relate only to the features at the locations provided.

Optionally, only one of the data sets relating to a single alignment is used in the step of correlation.

Thus the processor of the smart card need only compare a plurality of values to values within the template stored thereon in order to form a registration measure for use in user authorization in step 65. Preferably, the comparison is not a fixed comparison to allow for missed minutia or extra minutia within a template. Further preferably, the template accounts for differing orders of minutia in the above example due to inaccuracies in core locating that may occur. If a match is likely, the user is identified or recognized in step 66. If a match is other than likely, then the authorization attempt is rejected and the user is denied access.

Figure 7:
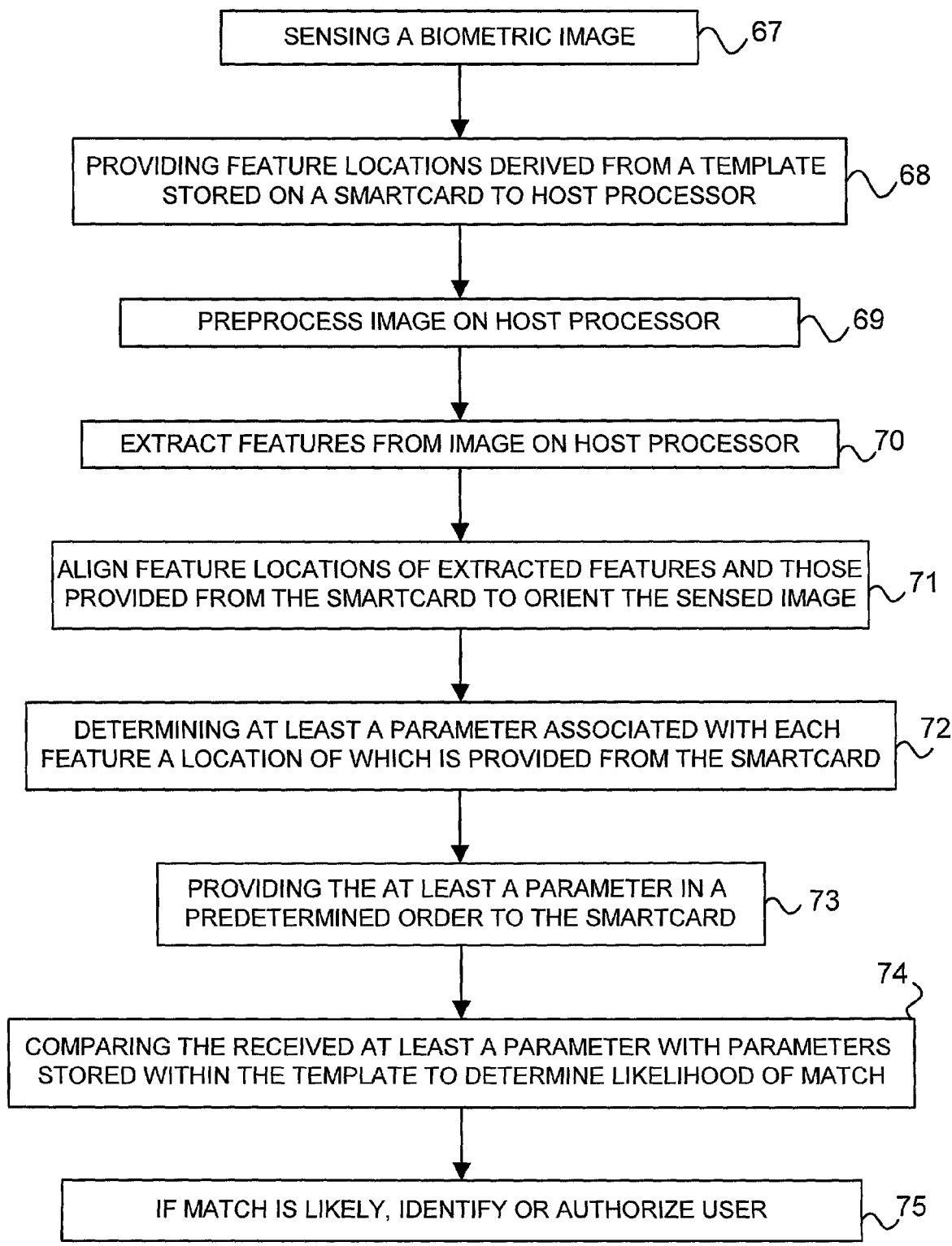
FIG. 7 is a simplified flow diagram of a method of preprocessing a fingerprint image according to another embodiment of the instant invention.

Referring now to FIG. 7, a method of preprocessing a fingerprint image according to the instant invention is shown, wherein biometric data in the form of a public portion of a template is not provided to a preprocessor, for instance a processor of a host system, from the smart card. As such, the process is alterable without suffering the drawbacks of the prior art methods.

A fingerprint image of the user is captured using an imaging device of the host system in step 67. Features locations derived from a template stored on a smart card are provided to the host processor in step 68. The image is filtered and the contrast is adjusted to a normalized level in step 69. The fingerprint image is then analyzed by the host processor to determine features thereof, in step 70. Typically features of fingerprints include ridge flow angle, minutia locations, minutia types, minutia directions, core location, core orientation, and so forth. Of course, in order for any of the features to have meaning, they all must be related to a global position; this global position and orientation is often related to the core location and orientation.

The method provides for provision of challenge data relating to a template, the data other than image data of a biometric information source. For instance, the smart card retrieves from the smart card memory a stored template, and retrieves a plurality of feature locations from the template. The plurality of locations is of identifiable features, preferably features having accurately identifiable locations.

A processor of the host system receiving the challenge and an image of a biometric information source then uses the challenge data to orient the biometric information source relative thereto in step 71. This is performed by identifying features within the image, determining feature locations, and then moving the feature locations to overlap the provided locations until a reasonable approximation of image positioning is achieved in step 72.

Once the image positioning is achieved, data relating to a plurality of features within the image are provided to the smart card in a predetermined order for correlation in step 73. For example, the data relates to minutia locations and directions of the 12 minutia nearest the first point provided.

Thus the processor of the smart card need only compare a plurality of values to values within the template stored thereon in order to form a registration measure for use in user authorization in step 74. Preferably, the comparison is not a fixed comparison to allow for missed minutia or extra minutia within a template. Further preferably, the template accounts for differing orders of minutia in the above example due to inaccuracies in core locating that may occur.

If a match is likely, the user is identified or recognized in step 75. If a match is other than likely, then the authorization attempt is rejected and the user is denied access.

Figure 8:
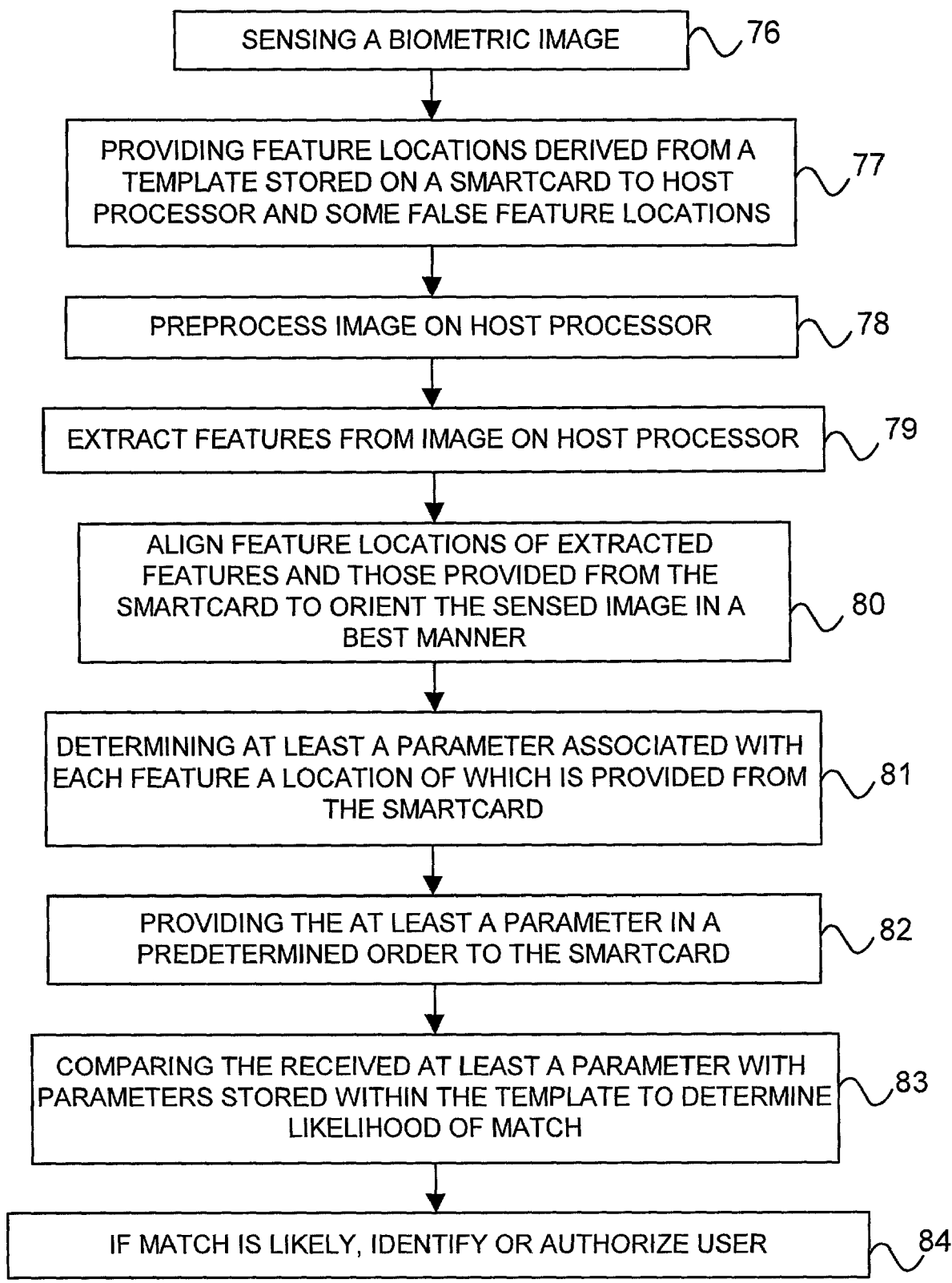
FIG. 8 is a simplified flow diagram of a method of preprocessing a fingerprint image according to another embodiment of the instant invention.

Referring now to FIG. 8 a method of preprocessing a fingerprint image according to the instant invention is shown, wherein biometric data in the form of a public portion of a template is not provided to a preprocessor, for instance a processor of a host system, from the smart card. As such, the process is alterable without suffering the drawbacks of the prior art methods.

A fingerprint image of the user is captured using an imaging device of the host system in step 76. Feature locations derived from a template stored on a smart card and some false feature locations are provided to the host processor in step 77. The image is filtered and the contrast is adjusted to a normalized level in step 78. The fingerprint image is then analyzed by the host processor to determine features thereof in step 79. Typically features of fingerprints include ridge flow angle, minutia locations, minutia types, minutia directions, core location, core orientation, and so forth. Of course, in order for any of the feature locations to have meaning, they all must be expressed within a global reference frame; this global reference frame includes position and orientation is often related to the core location and orientation.

The method provides for provision of challenge data relating to a template, the data other than image data of a biometric information source. For instance, the smart card retrieves from the smart card memory a stored template, and retrieves a plurality of feature locations from the template. The plurality of locations is of identifiable features, preferably features having accurately identifiable locations. According to the method of FIG. 8, the smart card further provided at least a false feature location, for instance a location that does not correspond to a location of a minutia point.

A processor of the host system receiving the challenge and an image of a biometric information source then uses the challenge data to orient the biometric information source relative thereto and in a best manner in step 80. This is performed by identifying features within the image, determining feature locations, and then moving the feature locations to overlap the provided locations until a reasonable approximation of image positioning is achieved in step 81.

Once the image positioning is achieved, data relating to a plurality of features within the image are provided to the smart card in a predetermined order for correlation in step 82. For example, the data relates to minutia directions and types for the feature locations provided. Of course, when the feature location is a false feature location, no such data is determinable. As such, even less information relating to the fingerprint data is provided.

Thus the processor of the smart card need only compare a plurality of values to values within the template stored thereon in order to form a registration measure for use in user authorization in step 83. Preferably, the comparison is not a fixed comparison to allow for missed minutia or extra minutia within a template. Further preferably, the template accounts for differing orders of minutia in the above example due to inaccuracies in core locating that may occur. If a match is likely, the user is identified or recognized in step 84. If a match is other than likely, then the authorization attempt is rejected and the user is denied access.

Figure 9:
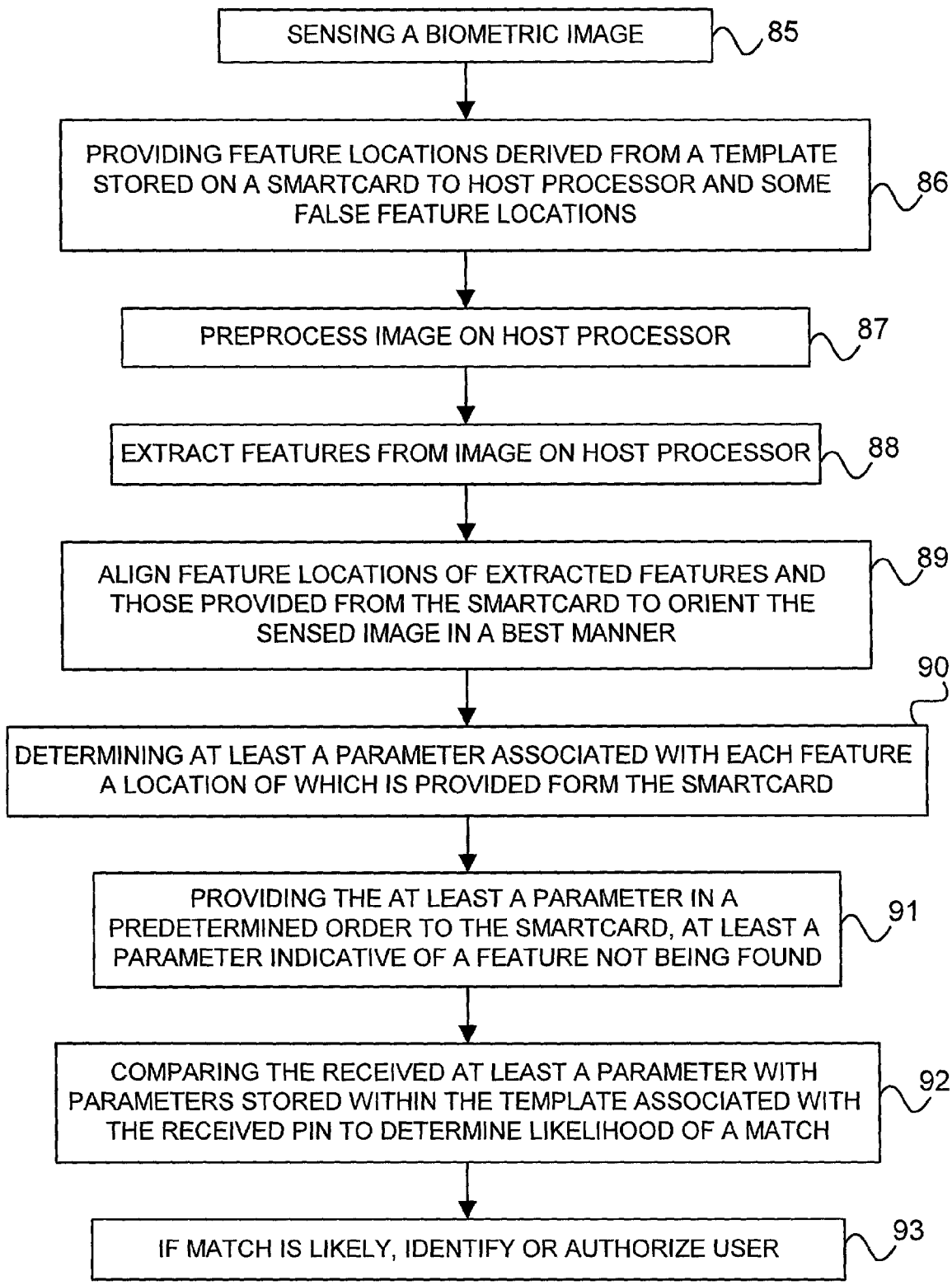
FIG. 9 is a simplified flow diagram of a method of preprocessing a fingerprint image according to another embodiment of the instant invention.

Referring now to FIG. 9, a method of preprocessing a fingerprint image according to the instant invention is shown, wherein biometric data in the form of a public portion of a template is not provided to a preprocessor, for instance a processor of a host system, from the smart card. As such, the process is alterable without suffering the drawbacks of the prior art methods.

A fingerprint image of the user is captured using an imaging device of the host system in step 85. Feature locations derived from a template stored on a smart card and some false feature locations are provided to the host processor in step 86. The image is filtered and the contrast is adjusted to a normalized level in step 87. The fingerprint image is then analyzed by the host processor to determine features thereof in step 88. Typically features of fingerprints include ridge flow angle, minutia locations, minutia types, minutia directions, core location, core orientation, and so forth in step 89. Of course, in order for any of the feature locations to have meaning, they all must be expressed within a global reference frame; this global reference frame includes position and orientation is often related to the core location and orientation.

The method provides for provision of challenge data relating to a template, the data other than image data of a biometric information source. For instance, the smart card retrieves from the smart card memory a stored template, and retrieves a plurality of feature locations from the template. The plurality of locations is of identifiable features, preferably features having accurately identifiable locations. According to the method of FIG. 9, the smart card further provided at least a false feature location, for instance a location that does not correspond to a location of a minutia point.

A processor of the host system receiving the challenge and an image of a biometric information source then uses the challenge data to orient the biometric information source relative thereto and in a best manner. This is performed by identifying features within the image, determining feature locations, and then moving the feature locations to overlap the provided locations until a reasonable approximation of image positioning is achieved in step 90.

Once the image positioning is achieved, data relating to a plurality of features within the image are provided to the smart card in a predetermined order for correlation in step 91. For example, the data relates to minutia locations and directions of the 12 minutia nearest the first point provided. In addition, the data includes an indication that no feature was extracted at the at least a false feature location. This information is used to verify the accuracy of the information received from the host processor.

Thus the processor of the smart card need only compare a plurality of values to values within the template stored thereon and to expected values for those features that are not present within the fingerprint image in order to form a registration measure for use in user authorization in step 92. Preferably, the comparison is not a fixed comparison to allow for missed minutia or extra minutia within a template. Further preferably, the template accounts for differing orders of minutia in the above example due to inaccuracies in core locating that may occur. If a match is likely, the user is identified or recognized in step 93. If a match is other than likely, then the authorization attempt is rejected and the user is denied access.

Figure 10:
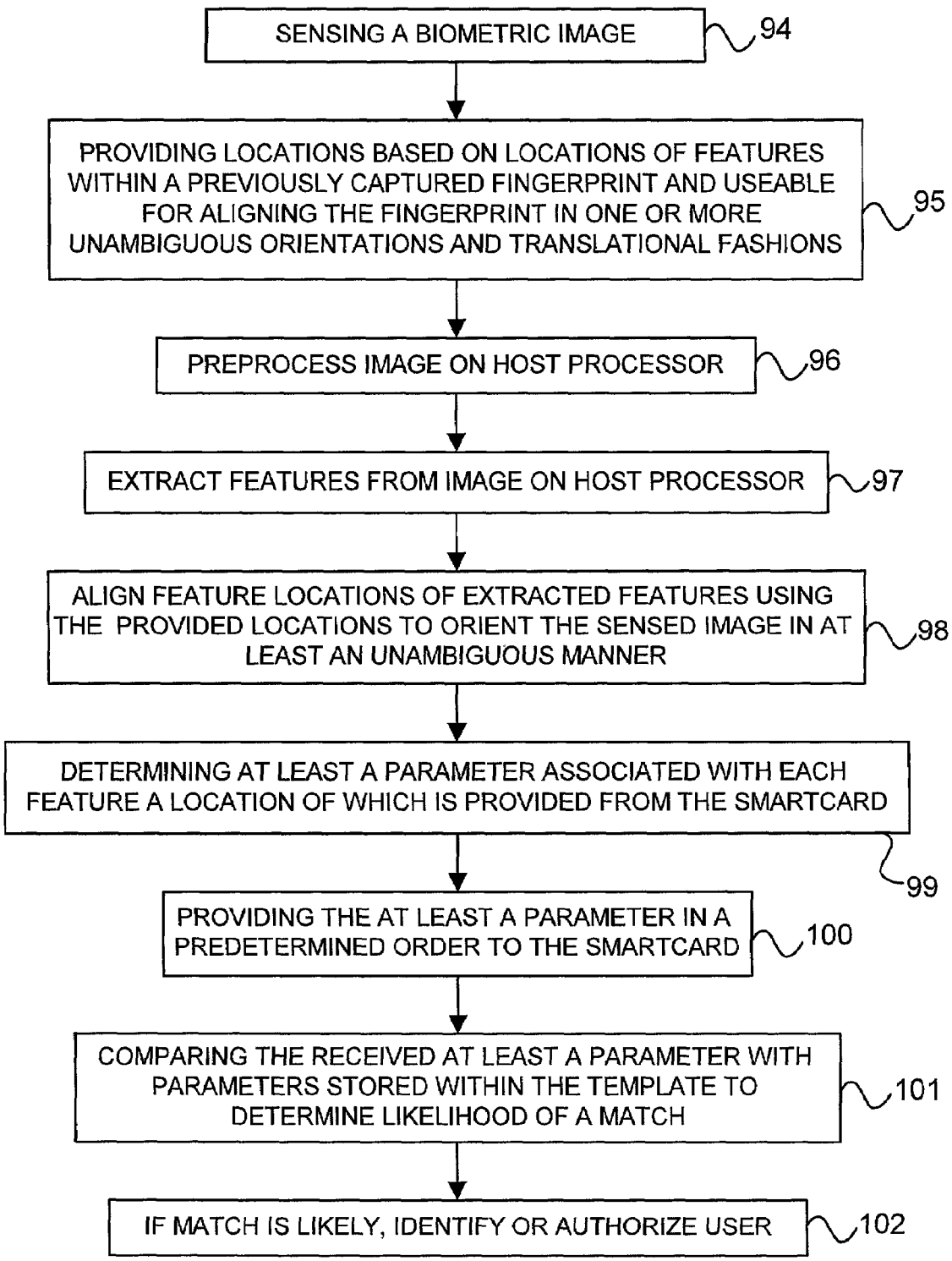
FIG. 10 is a simplified flow diagram of a method of preprocessing a fingerprint image according to another embodiment of the instant invention.

Referring now to FIG. 10, a method of preprocessing a fingerprint image according to the instant invention is shown, absent a step of providing biometric data to a processor of a host system, from the smart card.

A fingerprint image of the user is captured using an imaging device of the host system in step 94. The image is filtered and the contrast is adjusted to a normalized level in step 96. Locations based on locations of features within a previously captured fingerprint and useable for aligning the fingerprint in one or more unambiguous orientations and translational fashions are provided in step 95. The fingerprint image is then analyzed by the host processor to determine features thereof in step 97. Typically features of fingerprints include ridge flow angle, minutia locations, minutia types, minutia directions, core location, core orientation, and so forth in step 98. Of course, in order for any of the features to have meaning, they all must be related to a global position; this global position and orientation is often related to the core location and orientation. Next, the host processor receives from the smartcard a plurality of locations relative to feature locations associated with the template to which the fingerprint data is to be registered. Thus, the locations may be 4 pixels to the right and 3 pixels below each feature location. The plurality of locations is a known offset and direction from identifiable features, preferably features having accurately identifiable locations. Of course, the known offset is preferably predetermined though it could also be dynamic in nature requiring synchronization between the smartcard and the host or provided from the smartcard to the host. The host processor uses the extracted feature locations to orient the captured fingerprint image relative to the provided locations. This is performed by identifying features within the image, determining feature locations, and then moving the feature locations to overlap feature locations determined relative to the provided locations until a reasonable approximation of image positioning is achieved in step 99.

Once the image positioning is achieved, data relating to a plurality of features within the image are provided in a predetermined order to the smart card for correlation in step 100. For example, the data relates to minutia directions and types of features offset from the locations provided.

Thus the processor of the smart card need only compare a plurality of values to values within a template stored thereon in order to form a registration measure for use in user authorization in step 101. Preferably, the comparison is not a fixed comparison to allow for missed minutia or extra minutia within a template. If a match is likely, the user is identified or recognized in step 102. If a match is other than likely, then the authorization attempt is rejected and the user is denied access.

Advantageously, such a method permits different offsets to be applied to different provided feature locations thereby obfuscating any feature related data that may be determined from the data provided.

Figure 11:
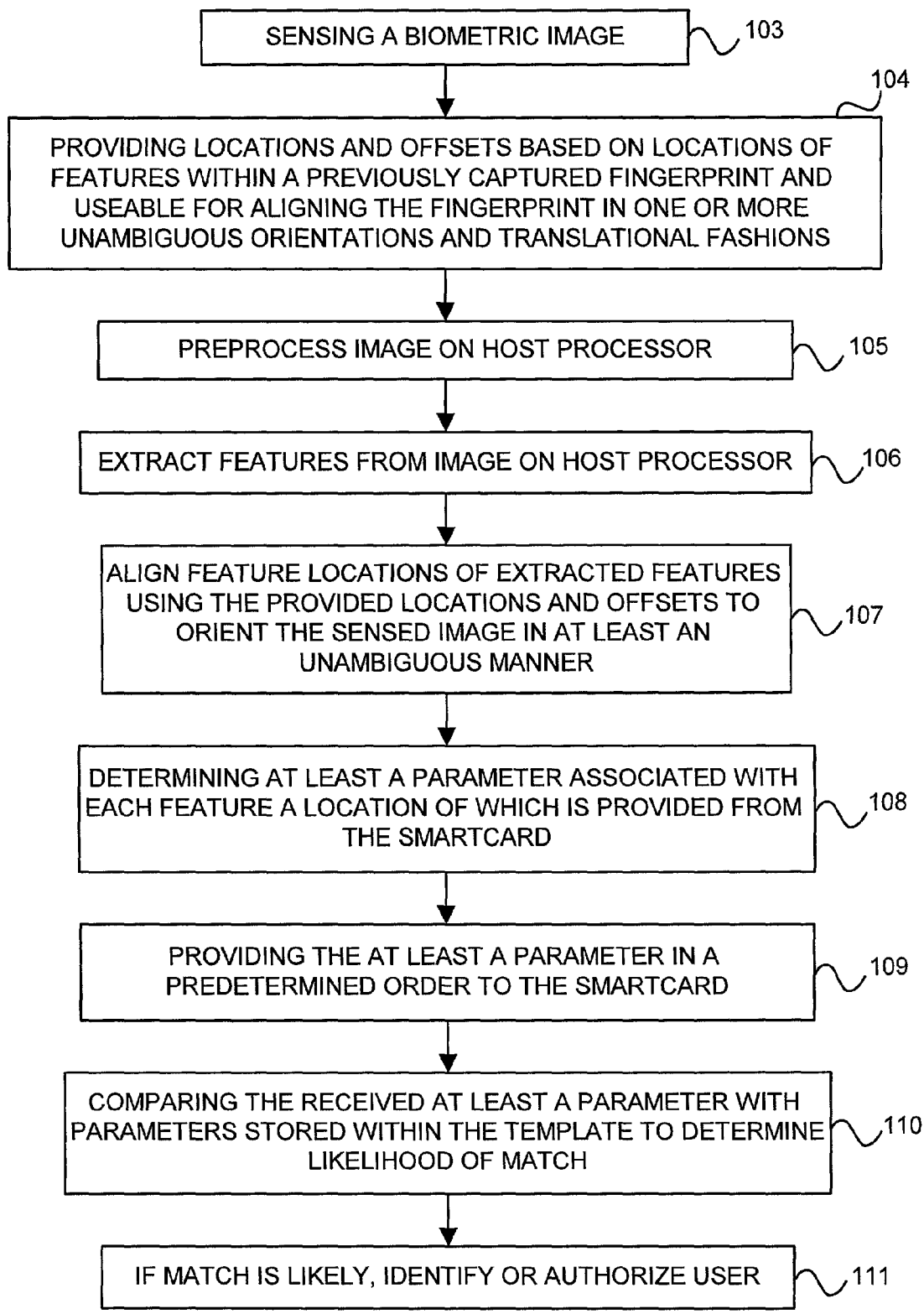
FIG. 11 is a simplified flow diagram of a method of preprocessing a fingerprint image according to another embodiment of the instant invention; and, FIG. 12 is a simplified flow diagram of a method of preprocessing a fingerprint image according to another embodiment of the instant invention.

Referring now to FIG. 11, a method of preprocessing a fingerprint image according to the instant invention is shown, absent a step of providing biometric data to a processor of a host system, from the smart card.

A fingerprint image of the user is captured using an imaging device of the host system in step 103. Locations and offsets based on locations of features within a previously captured fingerprint and useable for aligning the fingerprint in one or more unambiguous orientations and translational fashions are provided in step 104. The image is filtered and the contrast is adjusted to a normalized level in step 105. The fingerprint image is then analyzed by the host processor to determine features thereof in step 106. Typically features of fingerprints include ridge flow angle, minutia locations, minutia types, minutia directions, core location, core orientation, and so forth. Of course, in order for any of the features to have meaning, they all must be related to a global position; this global position and orientation is often related to the core location and orientation.

Next, the host processor receives from the smartcard a plurality of locations relative to feature locations associated with the template to which the fingerprint data is to be registered. Thus, the locations may be 4 pixels away from each feature location. The plurality of locations is a known offset from identifiable features, preferably features having accurately identifiable locations. Of course, the known offset is preferably predetermined though it could also be dynamic in nature requiring synchronization between the smartcard and the host or provided from the smartcard to the host in step 107. The host processor uses the extracted feature locations and directions to orient the captured fingerprint image relative to the provided locations. This is performed by identifying features within the image, determining feature locations and orientations, and then determining an image orientation such that the points the known offset from the features along the feature direction overlap the locations provided in step 108.

Of course, other data extractable from the features is also useful in determining the direction. Alternatively, the direction is known but the feature angle or type is used to determine an offset to the provided location.

Once the image positioning is achieved, data relating to a plurality of features within the image are provided in a predetermined order to the smart card for correlation in step 109. For example, the data relates to minutia directions and types of features offset from the locations provided.

Thus the processor of the smart card need only compare a plurality of values to values within a template stored thereon in order to form a registration measure for use in user authorization in step 110. Preferably, the comparison is not a fixed comparison to allow for missed minutia or extra minutia within a template. If a match is likely, the user is identified or recognized in step 111. If a match is other than likely, then the authorization attempt is rejected and the user is denied access.

In accordance with yet another embodiment of the invention there is provided a method wherein locations relating to feature locations but not providing any useful information relating to the biometric image is proposed. Here, similar to the method of FIG. 11, instead of feature locations, locations determinable from features and their locations are provided. However, unlike the method of FIG. 10, here the offset of the feature locations are determined and applied on the smartcard. This eliminates drawbacks of the method of FIG. 10. For example, if two different radii were used with a same individual, the two resulting circles, when plotted, have two intersections, which limits feature locations to two locations. As such, instead of a feature lying on a circle, it is now within one of two points. A third radius would likely result in knowledge of the feature location.

Figure 12:
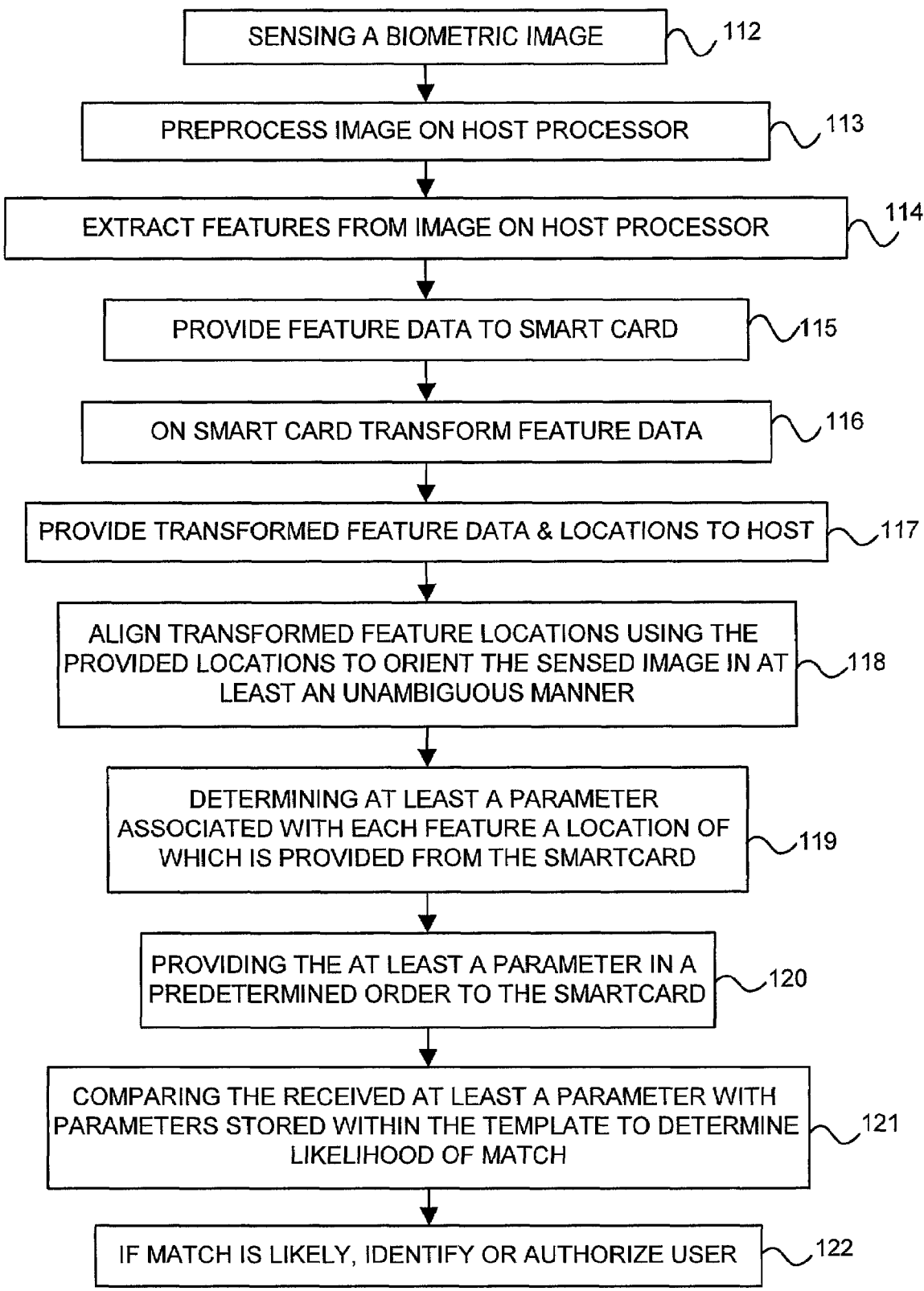

Referring now to FIG. 12, a method of preprocessing a fingerprint image according to the instant invention is shown, absent a step of providing biometric data to a processor of a host system, from the smart card.

A fingerprint image of the user is captured using an imaging device of the host system in step 112. The image is filtered and the contrast is adjusted to a normalized level in step 113. The fingerprint image is then analyzed by the host processor to determine features thereof in step 114. Typically features of fingerprints include ridge flow angle, minutia locations, minutia types, minutia directions, core location, core orientation, and so forth. Of course, in order for any of the features to have meaning, they all must be related to a global position; this global position and orientation is often related to the core location and orientation.

Next, the host processor provides to the smartcard data relating to the extracted features in step 115. For example, feature location and directions are provided. The smartcard applies a transform to each feature location in step 116. Since the direction of each feature is provided, the smartcard can use this information in applying the transform. As such, application of radius and angle offsets to each feature location is possible with a reasonable amount of computation. The transformed feature locations are returned to the host processor in step 117 along with a plurality of alignment locations in step 118. Of course, changing radii or angle or feature quality on which these are based is now possible without divulging information on the feature locations of features within the template in step 119. Further, the alignment problem for the host processor is a straightforward alignment process since the feature locations and the alignment locations are known at the outset and need not be redetermined for different potential alignments as is the case for the method of FIG. 11.

Thus, the transformed feature locations may be 4 pixels away from each feature location and the alignment locations are similarly 4 pixels from each feature location. Once the image positioning is achieved, data relating to a plurality of features within the image are provided in a predetermined order to the smart card for correlation in step 120. For example, the data relates to minutia directions and types of features offset from the locations provided.

Thus the processor of the smart card need only perform a simple transform for each feature location received and compare a plurality of values to values within a template stored thereon in order to form a registration measure for use in user authorization in step 121. Preferably, the comparison is not a fixed comparison to allow for missed minutia or extra minutia within a template. If a match is likely, the user is identified or recognized in step 122. If a match is other than likely, then the authorization attempt is rejected and the user is denied access.

Advantageously, such a method permits different offsets and/or directions to be applied to different features based on the features themselves in performing image alignment. This obfuscates any feature related data that may be determined from the data provided. This also makes alignment of the image data very difficult absent knowledge of the process and the image contents.

Alternatively, with the alignment data is provided a frame within which to provide image data or data relating to features therein. As such, though twelve (12) minutia locations are provided. Once the image is aligned to the minutia locations, a sub-image within a provided frame is analyzed for features and their types and orientations—angles. Thus, only a portion of the image is used for each correlation. Advantageously, the portion used for correlation can be arbitrarily moved between correlation processes to prevent record playback attacks and to prevent interception of useful image related feature data.

Similarly, the location data is movable. For example, within a template twelve feature locations are stored for each of 20 different rotations of the image. The results for those feature locations are also stored for each of the 20 different orientations. Thus, each time a same individual attempts to gain access, a different set of locations is provided and a different result is expected. Of course, selection from any number of available features further complicates the reverse engineering and/or hacking of such a system. Optionally, instead of storing each permutation on the smartcard with the template, they are calculated in parallel to the host processor determining the values based on the acquired image. Thus, the smartcard processing is no longer a bottleneck within the critical path of the authentication process and can now support any number of rotational angles and translations for any number of features.

Numerous other embodiments may be envisaged without departing from the spirit and scope of the invention.

What is claimed is:

1. A method for matching biometric data on a smart card including the steps of:
   providing a smart card having biometric template data stored thereon;
   providing a host processor in communication with the smart card;
   providing a sensed biometric image to the host processor;
   providing co-ordinate data relating to a plurality of non-contiguous features of the template data from the smart card to the host processor, wherein the non-contiguous features of the template data include minutia recorded within the template and false features for which data is other than stored within the template;
   extracting other data from the biometric image, the other data for correlation with the provided co-ordinate data;
   aligning the biometric image within a known frame of reference relative to the template data on the basis of the provided co-ordinate data and the other data;
   extracting biometric data from the biometric image, the biometric data within a known frame of reference; and
   providing the biometric data to the smartcard for matching with the biometric data stored on the smart card.

2. A method according to claim 1 comprising the step of identifying false feature locations.

3. A method according to claim 1 comprising the step of identifying false feature locations and wherein the biometric data includes data relating to feature locations identified as false feature locations.

4. A method according to claim 1 wherein the other data includes minutia locations of minutia located within the biometric image.

5. A method according to claim 4 wherein the biometric data includes data relating to the features for which co-ordinate data is provided from the smart card.

6. A method according to claim 5 wherein the biometric data is provided to the smart card in a same order of features as the order of the provided co-ordinate data, the biometric data for each feature provided in a same order as the feature coordinates for that feature were received from the smart card.

7. A method according to claim 6 wherein the biometric data includes the minutia directions for each minutia a co-ordinate for which data was received from the smart card.

8. A method according to claim 1 wherein the biometric data includes the minutia directions for each minutia a co-ordinate for which data was received from the smart card.

9. A method according to claim 1 wherein the plurality of non-contiguous features includes at least 10 features.

10. A method according to claim 9 wherein the plurality of non-contiguous features includes all features of at least one feature type.

11. A method according to claim 9 wherein the plurality of non-contiguous features are selected to support even distribution to prevent identification of regions of higher feature density.

12. A method according to claim 11 wherein the plurality of non-contiguous features are selected to maximize distances therebetween for use in alignment to reduce angular alignment errors.

13. A method according to claim 9 wherein the plurality of non-contiguous features are selected to maximize distances therebetween for use in alignment to reduce angular alignment errors.

14. A method according to claim 1 comprising the step of providing an identifier to the smart card, the identifier for use in determining the template.

15. A method according to claim 14 comprising the step of determining a template associated with the provided identifier as the template containing the biometric template data and retrieving the co-ordinate data from the template.

16. A method according to claim 1 comprising the step of pre processing the sensed biometric image with the host processor.

17. A method according to claim 16 wherein the pre-processing of the sensed biometric image eliminates potential false features from the biometric image.

18. A method according to claim 1 comprising the steps of: correlating the received biometric data and data stored within the template; and
    performing at least one step of identifying an individual and other than identifying the individual in dependence upon a result of the step of correlating.

19. A method according to claim 1 comprising the steps of:
    correlating the received biometric data and data stored within the template; and
    when a correlation is indicative of an authorized individual, retrieving data from the smart card for provision to the host processor.

20. A method according to claim 1 comprising the steps of:
    correlating the received biometric data and data stored within the template; and
    when a correlation is indicative of an authorized individual, performing a security related process on the smart card, the security related process for accessing secure data, the secure data accessible only upon a successful step of correlation indicative of an authorized individual.

21. A method according to claim 1 wherein the biometric image is a fingerprint image.

22. A method according to claim 1 wherein the biometric image is aligned within each of a plurality of known frames of reference and wherein biometric data is provided to the smart card within each of the plurality of frames of reference.

23. A method according to claim 22 wherein the plurality of known frames of reference includes two known frames of reference.

24. A biometric identification system comprising:
    a first transceiver;
    a first processor;
    a biometric sensor for sensing an image of a biometric information source, and for providing sensed biometric image data to the first processor, wherein the first processor is in operative communication with the first transceiver and the first processor executes the steps of:
        receiving sensed biometric image data from the biometric sensor,
        receiving alignment data including co-ordinates from the first transceiver, the alignment data for use by the first processor in aligning the sensed biometric image data within a known frame of reference, wherein the alignment data includes non-contiguous features of biometric template data including minutia recorded within the template and false features for which data is other than stored within the template;
        aligning the sensed biometric image data within the known frame of reference using the alignment data,
        determining from the aligned biometric image data extracted biometric data, and
        providing the extracted biometric data based on the aligned biometric image data and within the known frame of reference to the first transceiver;
    a memory for storing the biometric template data;
    a second transceiver in communication with the first transceiver for transmitting data thereto and for receiving data therefrom; and,
    a second processor in operative communication with the second transceiver, the second processor performing the steps of:
        providing said alignment data to the second transceiver for transmission to the first transceiver, the alignment data for use by the first processor in aligning sensed biometric data within a known frame of reference,
        receiving the extracted biometric data aligned within the known frame of reference, and
        correlating the received biometric data with biometric template data stored within the memory.

25. A biometric identification system according to claim 24 comprising an input terminal for use in providing a PIN, the PIN for use in retrieving the co-ordinates from a template within the memory and associated with the PIN.

26. A smart card for performing biometric identification thereon comprising:
    a transceiver for transmitting data from the smart card and for receiving data provided to the smart card;
    a processor; and,
    a memory for storing template data relating to a biometric image and for storing data relating to instructions for execution by the processor, the instructions comprising instructions for performing the steps of:
        providing alignment data including co-ordinates to the transceiver for transmission from the smart card, the alignment data for use by another processor in aligning sensed biometric data within a known frame of reference, wherein the alignment data includes non-contiguous features of template data including minutia recorded within the template and false features for which data is other than stored within the template,
        receiving biometric data aligned within the known frame of reference, the biometric data received from other than within the smart card, and
        correlating the received biometric data with template data stored within the memory, the correlating performed within the smart card; and
    performing one of identifying and authorizing an individual in dependence upon the step of correlating.

27. A method for registering biometric data with a template on a smart card including the steps of:
    roviding alignment data including co-ordinates for transmission from the smart card, the alignment data for use by another processor in aligning sensed biometric data within a known frame of reference, wherein the co-ordinates are co-ordinates of noncontiguous features within the template and the features include false features for which data is other than stored within the template,
    receiving biometric data aligned within the known frame of reference, the biometric data received from other than within the smart card, and correlating the received biometric data with template data stored within the smartcard, the correlating performed within the smart card to produce a correlation result.

28. A method according to claim 27 wherein the co-ordinates are co-ordinates of minutia.

29. A method according to claim 27 wherein the co-ordinates are co-ordinates determined based on features data included within the template but which features are other than within the template.

30. A method according to claim 29 wherein the co-ordinates are co-ordinates offset from feature co-ordinates by a fixed offset and in a direction.

31. A method according to claim 30 comprising the steps of:
receiving feature data; and,
transforming the feature data in accordance with the offset and the direction.

32. A method according to claim 29 wherein the co-ordinates are co-ordinates offset from feature co-ordinates by an offset and in a direction, at least one of the offset and the direction dependent upon a characteristic of the feature.

33. A method according to claim 32 comprising the steps of: receiving feature data; and,
transforming the feature data in accordance with the offset and the direction.

34. A method according to claim 27 comprising the steps of:
receiving data relating to identified false feature locations; and
verifying that the feature locations identified as false feature locations correspond to false feature locations.

35. A method according to claim 27 wherein the biometric data includes data relating to the features for which co-ordinate data is provided from the smart card.

36. A method according to claim 35 wherein the biometric data is received by the smart card in a same order of features as the order of the provided coordinates data, the biometric data for each feature received in an order determined based on the order the feature coordinates for that feature were provided from the smart card.

37. A method according to claim 36 wherein the biometric data is received by the smart card in a same order of features as the order of the provided coordinates data, the biometric data for each feature received in a same order as the feature coordinates for that feature were provided from the smart card.

38. A method according to claim 37 wherein the biometric data includes minutia directions for each minutia a co-ordinate for which data was provided from the smart card.

39. A method according to claim 27 wherein the biometric data includes the minutia directions for each minutia a co-ordinate for which data was provided by the smart card.

40. A method according to claim 27 wherein the co-ordinates correspond to at least 10 feature locations.

41. A method according to claim 40 wherein co-ordinates correspond to locations for all features of at least one feature type and having data relating thereto stored within the template.

42. A method according to claim 40 wherein the co-ordinates are selected to support even distribution to prevent identification of regions of higher feature density.

43. A method according to claim 42 wherein the co-ordinates are selected to maximize distances therebetween for use in alignment to reduce angular alignment errors.

44. A method according to claim 40 wherein the co-ordinates are selected to maximize distances therebetween for use in alignment to reduce angular alignment errors.

45. A method according to claim 27 comprising the step of receiving an identifier, the identifier for use in determining the template.

46. A method according to claim 45 comprising the steps of determining a template associated with the received identifier as the template and retrieving the co-ordinate data from the template.

47. A method according to claim 27 comprising the steps of performing at least one step of identifying an individual and other than identifying the individual in dependence upon a result of the step of correlating.

48. A method according to claim 27 comprising a step of:
when a correlation is indicative of an authorized individual, retrieving data from the smart card for provision to the host processor.

49. A method according to claim 27 comprising a step of when a correlation is indicative of an authorized individual, performing a security related process on the smartcard, the security related process for accessing secure data, the secure data accessible only upon a successful step of correlation indicative of an authorized individual.

50. A method according to claim 27 wherein the biometric image is a fingerprint image.

51. A method according to claim 27 wherein the biometric data includes data determined within each of a plurality of known frames of reference and wherein the step of correlating is performed for identifying the data within the known frame of reference and correlating that data with data from the template.

52. A biometric imaging station for use with a portable electronic device in performing biometric identification on the portable electronic device comprising:
a biometric sensor for sensing an image of a biometric information source to provide sensed biometric image data;
a transceiver for transmitting data to the portable electronic device and for receiving data provided from the portable electronic device; and,
a processor for performing the steps of:
receiving alignment data including co-ordinates from the transceiver of the portable electronic device, the alignment data for use by the processor in aligning the sensed biometric data within a known frame of reference, wherein the alignment data includes non-contiguous features of biometric template data including minutia recorded within the template and false features for which data is other than stored within the template,
aligning the sensed biometric image data within the known frame of reference using the alignment data,
determining from the aligned biometric image data extracted biometric data, and
providing the extracted biometric data based on the aligned biometric image data and within the known frame of reference to the portable electronic device.

53. A computer readable medium having data stored therein relating to instructions for enabling a processor to perform the steps of:
receiving alignment data including co-ordinates from a transceiver of a portable electronic device, the alignment data for use by the processor in aligning sensed biometric image data within a known frame of reference, wherein the alignment data includes non-contiguous features of biometric template data including minutia recorded within the template and false features for which data is other than stored within the template, aligning the sensed biometric image data within the known frame of reference using the alignment data, determining from the aligned biometric image data extracted biometric data, and providing the extracted biometric data based on the aligned biometric image data and within the known frame of reference to the portable electronic device.

54. A method for registering biometric data on a smart card including the steps of:

sensing a biometric source to provide biometric image data representing a biometric image;

receiving alignment data including co-ordinates from the smart card, the alignment data for use in aligning sensed biometric image data within a known frame of reference, wherein the co-ordinates relate to non-contiguous features of the template data and include minutia recorded within the template and false features for which data is other than stored within the template;

aligning the sensed biometric image data within the known frame of reference, determining from the aligned biometric image data biometric data, and providing the determined biometric data based on the aligned biometric image data and within the known frame of reference to the smart card.

55. A method according to claim 54 comprising the step of identifying false feature locations.

56. A method according to claim 54 comprising the step of identifying false feature locations and wherein the biometric data includes data relating to feature locations identified as false feature locations.

57. A method according to claim 54 wherein the other data includes minutia locations of minutia located within the biometric image.

58. A method according to claim 57 wherein the biometric data includes data relating to the features for which co-ordinate data is provided from the smart card.

59. A method according to claim 58 wherein the biometric data is provided to the smart card in a same order of features as the order of the provided coordinates data, the biometric data for each feature provided in a same order as the feature coordinates for that feature were received from the smart card.

60. A method according to claim 59 wherein the biometric data includes the minutia directions for each minutia a co-ordinate for which data was received from the smart card.

61. A method according to claim 54 wherein the biometric data includes the minutia directions for each minutia a co-ordinate for which data was received from the smart card.

62. A method according to claim 54 comprising the step of providing an identifier to the smart card, the identifier for use in determining the template.

63. A method according to claim 54 comprising the step of pre-processing the sensed biometric image.

64. A method according to claim 63 wherein the pre-processing of the sensed biometric image eliminates potential false features from the biometric image.

65. A method according to claim 54 wherein the biometric image is a fingerprint image.

66. A method according to claim 54 wherein the biometric image is aligned within each of a plurality of known frames of reference and wherein biometric data is provided to the smart card within each of the plurality of frames of reference.

67. A method according to claim 66 wherein the plurality of known frames of reference includes two known frames of reference.

68. A method for registering biometric data on a smart card including the steps of:

sensing a biometric source to provide biometric image data representing a biometric image;

receiving alignment data including co-ordinates from the smart card, the alignment data for use in orienting the biometric source relative to the biometric image in each of a plurality of orientations, wherein the co-ordinates relate to non-contiguous features of template data and include minutia recorded within the template;

aligning the sensed biometric image data for each one of the plurality of orientations; and providing data relating to a plurality of features within the biometric image for each one of the plurality of orientations to the smart card in a predetermined order.

69. A method according to claim 68, comprising the steps of:

correlating the plurality of features within the biometric image for each one of the plurality of orientations; and performing at least one step of identifying an individual and other than identifying the individual in dependence upon a result of the step of correlating.

70. A method according to claim 68, wherein the step of aligning the sensed biometric image data for each one of the plurality of orientations comprises the steps of identifying features within the biometric image, determining feature locations within the biometric image, and moving the feature locations to overlap provided locations in the plurality of orientations until a reasonable approximation of image positioning is achieved for each of the orientations.

71. method according to claim 68, wherein the step of providing data relating to a plurality of features within the biometric image for each one of the plurality of orientations to the smart card in a predetermined order comprises the step of providing data relating to minutia locations and directions of a number of minutia nearest a first point provided.

72. A method for registering biometric data on a smart card including the steps of:

sensing a biometric source to provide biometric image data representing a biometric image;

extracting features within the biometric image;

providing data relating to the extracted features to the smart card;

the smart card applying a transform to each received feature location;

returning the transformed feature locations to a host processor along with a plurality of alignment locations;

aligning the sensed biometric image data to the transformed feature locations; and providing data relating to a plurality of features within the biometric image to the smart card in a predetermined order.

73. A method according to claim 72, comprising the steps of:

reverse transforming the transformed feature locations;

correlating the plurality of features within the biometric image from the reverse transformed feature locations with a template image in the smart card; and performing at least one step of identifying an individual and other than identifying the individual in dependence upon a result of the step of correlating.

74. A method according to claim 72, wherein the applied transform includes application of radius and angle offsets to each feature location.

75. A method according to claim 72, wherein the applied transform includes application of different offsets and/or directions to different features based on the features themselves.

76. A method according to claim 72, wherein a frame within which to provide image data or data relating to features is provided with the alignment locations in the step of returning the transformed feature locations to the host processor along with the plurality of alignment locations.

77. A method according to claim 76, wherein once the sensed biometric image data has been aligned to the transformed feature locations, analyzing a sub-image within a provided frame for features and their types and orientations.

78. A method for registering biometric data on a smart card including the steps of:

sensing a biometric source to provide biometric image data representing a biometric image;

extracting features within the biometric image;

providing data relating to the extracted features to the smart card; and the smart card comparing the data relating to the extracted features to a selected one of a plurality of different templates containing different rotations of the biometric image, wherein a different template is selected each time a same individual provides the biometric image in said sensing step.

79. A method for registering biometric data on a smart card including the steps of:

sensing a biometric source to provide biometric image data representing a biometric image;

extracting features within the biometric image;

providing data relating to the extracted features to the smart card;

calculating a permutation of stored template data based on the sensed biometric image; and comparing the data relating to the extracted features to the permutated template, wherein a different permutation of the template is calculated each time a same individual provides the biometric image in said sensing step.

* * * * *

UNITED STATES PATENT AND TRADEMARK OFFICE
CERTIFICATE OF CORRECTION

PATENT NO. : 7,274,807 B2  Page 1 of 1
APPLICATION NO. : 10/157120
DATED : September 25, 2007
INVENTOR(S) : Robert D. Hillhouse et al.

It is certified that error appears in the above-identified patent and that said Letters Patent is hereby corrected as shown below:

Column 13,
Line 12, after "orientation." start a new paragraph with "Next, the host…".

Column 17,
Line 13, delete "pre processing" and insert -- pre-processing --.
Line 19, after "of:" start a new paragraph with "correlating the received…".

Column 18,
Line 9, after "biometric image" there should not be a new paragraph.
Continue with "data and within…".
Line 57, delete "roviding" and insert -- providing --.

Column 19,
Line 23, after "of:" start a new paragraph with "receiving feature data; and".

Column 22,
Line 32, before "method" insert -- A --.

Column 24,
Line 4, after "image," there should not be a new paragraph. Continue with "wherein a different…".

Signed and Sealed this

Twenty-ninth Day of April, 2008

JON W. DUDAS
*Director of the United States Patent and Trademark Office*